United States Patent [19]

Vaca

[11] 4,227,484
[45] Oct. 14, 1980

[54] CAKE FROSTING DEVICE

[76] Inventor: Humberto Vaca, 11874 College, Detroit, Mich. 48205

[21] Appl. No.: 921,852

[22] Filed: Jul. 3, 1978

[51] Int. Cl.³ .............................................. B25B 11/00
[52] U.S. Cl. ...................................... 118/502; 118/13; 118/18; 269/54.5
[58] Field of Search ............................... 269/53–54.5; 118/18, 502, 13

[56] References Cited

U.S. PATENT DOCUMENTS

| | | | |
|---|---|---|---|
| 884,810 | 4/1908 | Garlock | 269/54.5 |
| 1,806,887 | 5/1931 | Bruno | 269/54.5 |
| 2,503,673 | 4/1950 | Lindquist | 118/18 |
| 3,912,249 | 10/1975 | Vaca | 269/54.5 |

Primary Examiner—Ralph S. Kendall
Attorney, Agent, or Firm—Barnes, Kisselle, Raisch & Choate

[57] ABSTRACT

A pedestal and cake platter removably supported thereon having a corresponding plurality of recesses and lugs which interengage after rotation of said platter through a half turn or less on said pedestal to maintain holes in the platter vertically aligned above outwardly open recesses in the column of the pedestal forming guides. A headed pin moved horizontally beneath the platter is engaged by a guide to align it vertically beneath one of the holes with its upper end slightly beneath the hole. The pin is movable upwardly through the hole to impale cake layers on the platter. The platter and a cake plate removably positioned thereon have recesses and projections interengageable to register holes in the plate with those in the platter to pass the pins upwardly.

16 Claims, 7 Drawing Figures

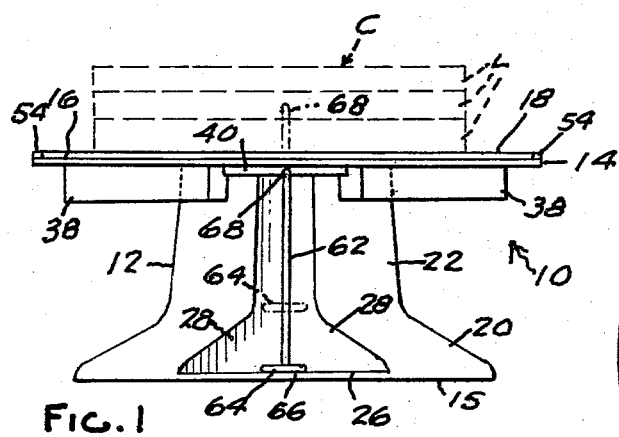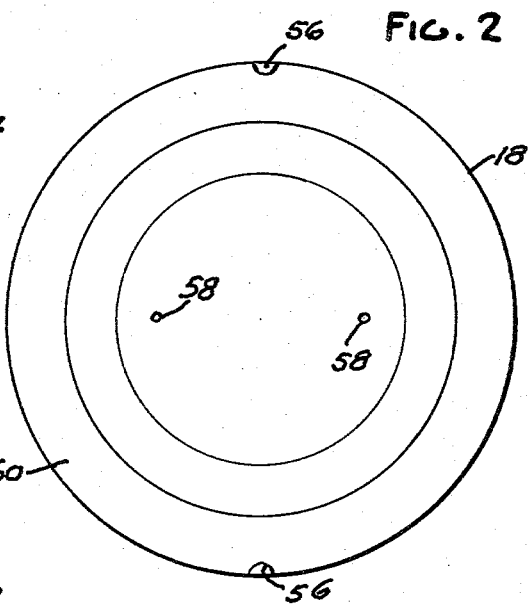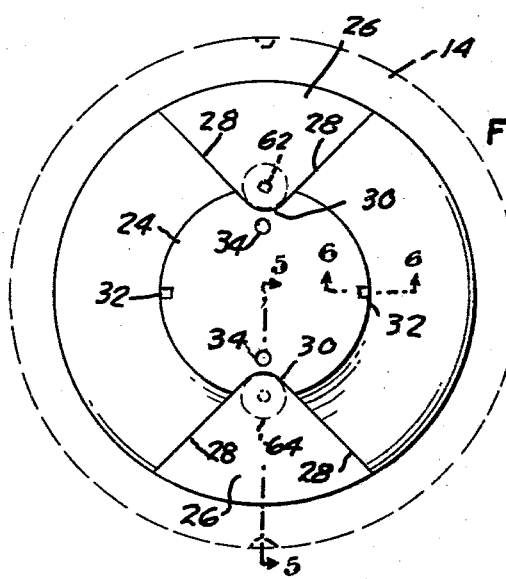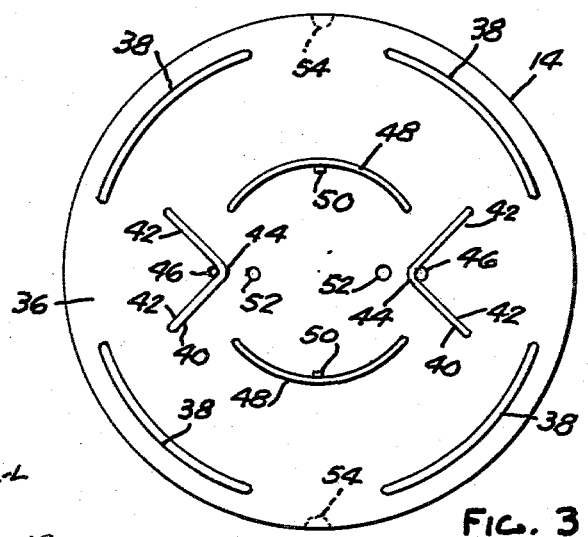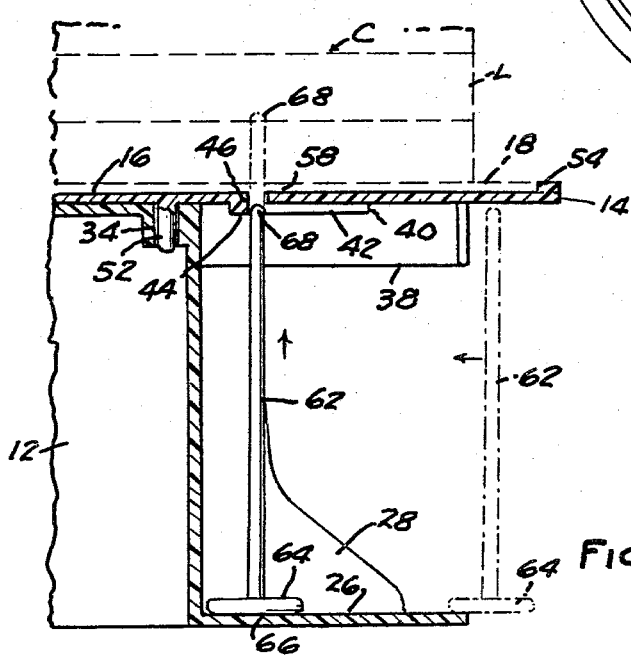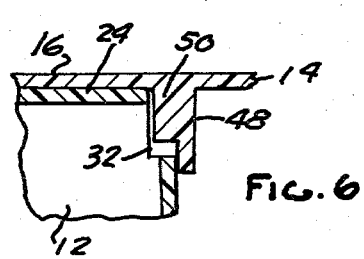

CAKE FROSTING DEVICE

This invention relates to a device which facilitates application of icing to layers of a cake. More particularly, the invention involves such a device which comprises a cake platter removably supported on a pedestal and pins movable upwardly through apertures in the platter to impale cake layers thereon. The layer or layers are thereby effectively anchored on the platter to enable icing to be applied to the layers by a spatula or the like without fear of pushing the cake off of the platter. A device of this type is shown in my U.S. Pat. No. 3,912,249 and the present invention represents an improvement over the device disclosed therein.

While my patented device has been very successful in use, it does have certain functional limitations and inconvenient features. For example, it is difficult to use the device in connection with small diameter cakes; there is no particular storage space for the pins; no provision is made for transferring the iced cake layers to the usual paperboard or equivalent plate for storage and handling; the platter may have to be turned through nearly 360° before it drops into a properly supported position on the pedestal; and either the pins or the platter must be tilted to position the pins properly beneath the platter for upward, cake impaling movement.

The object of the present invention is to provide a relatively simple, inexpensive cake frosting device of the type under consideration improved to eliminate or lessen each of the above-mentioned functional limitations and inconvenient features. One form of the invention is illustrated in the accompanying drawings wherein:

FIG. 1 is an elevational view of a device according to the present invention in use;

FIG. 2 is a top plan view of a cake plate forming part of the invention;

FIG. 3 is a bottom plan view of the cake platter;

FIG. 4 is a top plan view of the platter-supporting pedestal with the platter and impaling pins shown in broken lines;

FIG. 5 is an enlarged fragmentary sectional view on line 5—5 of FIG. 4;

FIG. 6 is an enlarged fragmentary sectional view on line 6—6 of FIG. 4;

Figure 7:
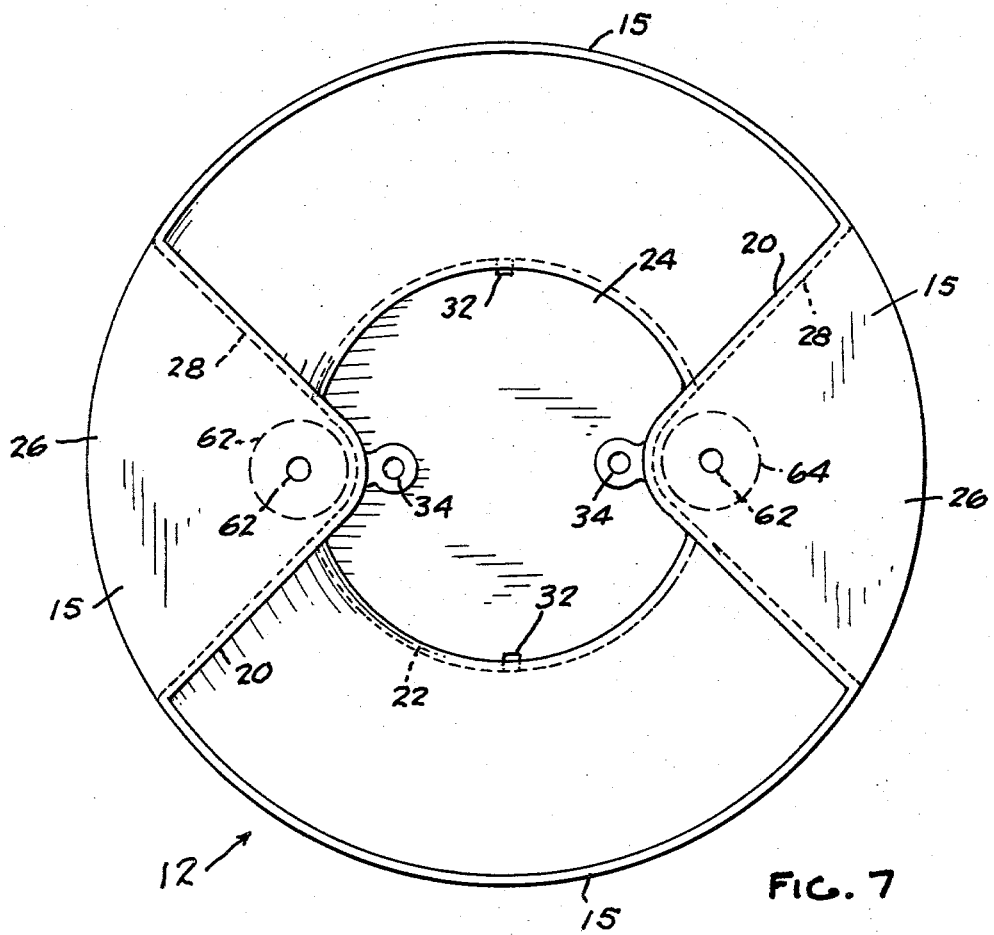
FIG. 7 is an enlarged scale bottom plan view of the pedestal with the impaling pins shown in broken lines.

Shown in the drawings is a cake frosting device 10 according to the present invention having a pedestal 12 which supports a platter 14 adapted to receive a cake C comprised of one or more layers L. The pedestal 12 illustrated has the form of a hollow shell and has bottom surface portions 15 adapted to rest on a table top or the like. Platter 14 has an upper face 16 overlaid by a layer of material 18 of stiff paperboard or the like forming a removable cake plate. The lowermost layer L of the cake rests on this plate in use.

Pedestal 12 has a base portion 20, a column portion 22 extending upwardly from the base and terminating at a top 24 having a cross dimension smaller than that of base 20. Base 20 and column 22 have formed therein a plurality of outwardly open recesses 26 having side walls 28 which taper inwardly and adjoin at an apex 30 for a purpose to be described. In the structure illustrated, there are two recesses 26 disposed diametrically opposite from each other. Pedestal column 22 has a plurality of peripheral notches 32 which open through top 24 of the pedestal and top 24 has a corresponding plurality of socket openings 34 disposed on a line which is angularly displaced from the line between notches 32. In the structure illustrated, there are two each of the notches and sockets and the lines between them are at right angles to each other.

Platter 14 has an underside 36 downwardly from which a plurality of legs 38 project near the outer periphery of the platter. Also projecting downwardly from underside 36 are a plurality of outwardly opening V-shaped guides 40, one for each recess 26 in pedestal 12. The inner surfaces 42 of the guides from the guide surfaces and each pair of guide surfaces intersect at an apex 44 immediately adjacent an opening 46 which extends from underside 36 to upper face 16 of the platter.

Also projecting downwardly from underside 36 are a pair of arcuate elements 48 which cooperate to form in effect an interrupted collar dimensioned to fit rotatably around pedestal top 24. On the inner sides of collar elements 48 are a plurality of downwardly projecting ribs 50, one for each slot 32 in the pedestal top. A plurality of pins 52 also project downwardly from underside 36, there being one pin 52 for each socket 34 in the pedestal top. Ribs 50 and pins 52 are disposed respectively on lines angled to each other similarly to the lines between notches 32 and sockets 34 in the pedestal. Ribs 50 and pins 52 have equal heights and this height is less than that of collar elements 48 (FIG. 6). Also, legs 38 and collar elements 48 preferably have the same height. For a reason to be described, guide apices 44 and openings 46 through the platter are preferably disposed within the circumference of the circle defined by collar elements 48.

A plurality of lugs 54 project upwardly from the outer peripheral portions of upper surface 16 of platter 14. Cake plate 18 has a corresponding plurality of peripheral radial recesses 56 dimensioned to fit snugly around lugs 54. Plate 18 has a plurality of openings 58 therethrough, one for each opening 46 in platter 14. The upper surface 60 of plate 18 is provided with indicia of the outlines of the peripheries of cake layers of different dimensions and such indicia may comprise by way of example drawn or indented lines. In the device illustrated, plate 18 has a diameter of 11 inches for receiving cake layers of that size or smaller and has indicia in the form of circles thereon indicating the outlines of cake layers of 6 and 8 inches in diameter.

A pin 62 is provided for each aperture 46 in platter 14. Each pin is preferably provided with a head 64 which in use rests upon an upwardly facing surface 66 of pedestal base 20. Pins 62 have such a length that when their heads 64 are resting on surface 66 their upper ends 68 are immediately adjacent to but are slightly vertically clear of the lower ends of apertures 46 as best illustrated in FIG. 5. Sockets 34 in pedestal 12 are preferably diametered to receive the shanks of pins 52 for a purpose to be described.

Pedestal 12 is preferably made as one integral part from a material such as molded plastic. Platter 14 can be formed of a similar material, as can pins 62.

In use, it will be assumed that initially platter 14 and pins 62 have been removed from pedestal 12. To prepare device 10 for use, platter 14 is placed on top of the pedestal with collar elements 48 engaged around the periphery of top 24 of the pedestal. In most cases the platter will probably have random circumferential orientation with respect to the pedestal top and ribs 50 and pins 52 will very likely be angularly displaced from notches 32 and sockets 34 respectively in the pedestal top. Since ribs 50 and pins 52 have equal heights and are angularly displaced from each other, they provide four legs which support platter 14 horizontally on pedestal top 24. Since collar elements 48 have a height greater than that of the ribs and pins, collar elements 48 project downwardly into engagement around the pedestal top to maintain the platter laterally in position on the pedestal top. The platter is now rotated about a vertical axis and after such rotation through 180° or less ribs 50 drop into notches 32 and pins 52 drop into sockets 34. When this occurs, apertures 46 in the platter are aligned vertically above portions of pedestal surface 66 which will receive pin heads 64.

Before or after platter 14 is mounted on pedestal 12, paper plate 18 is assembled with platter 14. This is done simply by interengaging the plate and top surface 16 of the platter with recesses 56 in the plate aligned with lugs 54 on the platter and interengaging the lugs and recesses. When this is done, openings 58 in the plate are aligned with apertures 46 in the platter (FIG. 5).

Heads 64 of pins 62 are now placed on pedestal surfaces 66 in generally radial alignment with pedestal surfaces 28. The pins are then moved inwardly until heads 64 engage apices 30 at which time the upwardly projecting pins reach a position in which their upper ends 68 are vertically aligned beneath platter apertures 46. Surfaces 28 may serve as guides during this movement. Since the overall height of pins 62 is less than the vertical distance between pedestal surfaces 66 and underside 36 of platter 14, the pins can be properly positioned by simple horizontal movement without the necessity of tilting either the pins or platter 14. Apices 30 are shown as being rounded to engage around an arc of pin heads 64. However, surfaces 28 could be extended to intersect at an angle, it being only necessary that surfaces 28 engage the pin heads at locations appropriate for aligning upper ends 68 of the pins vertically beneath platter apertures 46.

In most instances interengagement of surfaces 28 and pin heads 64 is adequate to properly position pins 62 with respect to apertures 46. In some instances, however, it is helpful also to be able to guide upper ends 68 of the pins as they are moved into position, particularly in the final stages of movement. The portions of surfaces 42 of guides 40 adjacent apices 44 serve this purpose. When upper ends 68 of pins 62 are engaged within apices 44, upper ends 68 are aligned vertically beneath apertures 46. It will be noted that guide surfaces 42 are respectively generally parallel to guide surfaces 28 in the pedestal.

When platter 14, plate 18 and pins 62 are assembled on pedestal 12 in the manner described, a cake layer L is placed on plate 18. If the layer has relatively large diameter, for example, 11 inches, the outer periphery of plate 18 and platter 14 serve to center the layer thereon. If the layer has a smaller diameter, for example, 6 inches or 8 inches, the appropriate circular indicia on top of plate 18 can be used for centering the cake layer. Since apices 44 and apertures 46 are disposed within the circumference of a circle defined by collar elements 48 device 10 can be used with cakes having a relatively small diameter or other cross dimension.

With a layer in place, pins 62 are manually moved upwardly through aligned openings 46,58 to impale the cake layer and thereby prevent it from being moved laterally on plate 18 during the application of icing with a spatula or the like. The pins preferably are not pushed up through the top surface of the layer so that the icing can proceed without the necessity of working around the pins. The pins are relatively light and are held in their upward position by friction with the cake material while the icing is applied. Once the lowermost cake layer L has been iced, another layer may be placed on top of the first, and pins 62 further elevated to penetrate into the second layer to facilitate icing of the latter. The procedure can be repeated with respect to a third layer and so on.

When cake C has been completely iced, pins 62 are drawn downwardly out of the cake layers to a position in which heads 64 of the pins are again engaged against pedestal surfaces 66 and upper ends 68 of the pins are below openings 58 and 46 in plate 18 and platter 14 respectively. The cake may now be removed from platter 14. Advantageously this is done by lifting plate 18, cake and all, off of platter 14. Thus, it is unnecessary to effect any intermediate transfer of the iced cake from platter 14 to plate 18 for subsequent storage or handling. Alternatively, platter 14 together with plate 18 and cake C can be removed from pedestal 12 simply by lifting platter 14 upwardly. The platter can then be placed on a supporting surface with legs 38 and collar elements 48 engaged against the surface to provide firm support for the platter.

When platter 14 has been removed from pedestal 12, pins 62 can be stored on the pedestal by inserting ends 68 of the pins downwardly into sockets 34 in the pedestal and allowing heads 64 of the pins to rest on pedestal top 24. This minimizes the possibility of damaging or misplacing the pins. To store the platter, pedestal, and pins together, the platter is mounted on the pedestal top in the manner described and the pins are inserted downwardly through apertures 46 until pin heads 64 rest on platter top 16. When device 10 is again readied for use, pins 62 can be withdrawn from sockets 34 or apertures 46 and immediately placed in position with their heads engaged against apices 30. If this procedure is followed, the pins may become shifted out of position during assembly of platter 14 onto pedestal 12 in the manner described and it would be advisable after the platter is in place to check the positions of the pins to insure proper positioning of the upper ends 68 of the pins.

I claim:

1. In a cake frosting device having a platter with an upper face adapted to support a cake layer and having an underside, a pedestal adapted to rest on a support surface and to support said platter in a position elevated above said surface, said platter having a plurality of apertured portions each of which opens at said upper face and said underside, and a plurality of pins dimensioned to slide generally vertically through said apertured portions for impaling a cake layer on said platter, improved structure wherein, said pedestal comprises a bottom, a top and a column extending from said bottom to said top, said column having for each said apertured portion a side portion with a laterally outwardly opening recess having wall portions which extend from said bottom to said top, said wall portions being positioned for engagement by a pin moved generally horizontally beneath said platter, said wall portions of each recess extending toward a said apertured portion and being effective responsive to engagement therewith of a pin so moving to guide a said pin to a said apertured portion.

2. The structure defined in claim 1 wherein each said pin has a length such that when it is vertically aligned beneath a said apertured portion it extends from said bottom to a location at which its upper end portion is in a position immediately adjacent to but vertically downwardly clear of said apertured portion.

3. The structure defined in claim 2 wherein said bottom has an upwardly disposed surface forming a support, each said pin having a head adjacent its lower end, the periphery of which is so engageable with said wall portions and the bottom of which rests on said support to maintain said pin in said position.

4. The structure defined in claim 3 wherein said underside of said platter is provided with guide surfaces so positioned and oriented relative to said wall portions as to engage said upper end portion of a pin so moving and being effective responsive to such engagement to guide said upper end portion to a said apertured portion.

5. The structure defined in claim 4 wherein said wall portions and said guide surfaces are V-shaped and generally parallel.

6. The structure defined in claim 1 wherein said pedestal top has peripheral portions lying on a circle, said peripheral portions having a plurality of vertical recesses, said pedestal top having a corresponding plurality of vertical sockets spaced radially inwardly of said recesses and displaced angularly therefrom, said underside of said platter having for each said recess a downwardly projecting lug and having for each said socket a downwardly projecting pin, said lugs and pins being engageable within said recesses and sockets respectively in predetermined rotative positions of said platter relative to said pedestal top.

7. The structure defined in claim 6 wherein said underside of said platter is provided with downwardly projecting mounting means having radially inward surface portions disposed on a circle for engagement around said peripheral portions of said pedestal top when said lugs and pins are engaged against said top, said mounting means being effective to retain said platter on said pedestal top during rotation of said platter toward said predetermined angular positions.

8. The structure defined in claim 7 wherein said mounting means comprises means effectively forming a collar which at least partially surrounds said pedestal top.

9. The structure defined in claim 8 wherein said collar is circumferentially interrupted, said apertured portions being disposed within the interruptions.

10. The structure defined in claim 8 wherein said underside of said platter is provided adjacent its periphery with other downwardly projecting means of substantially the same height as said collar, said other means and collar having bottom surface portions which corporate to form legs effective to support said platter on a surface when removed from said pedestal.

11. The structure defined in claim 1 wherein said pedestal has for each said pin a hole extending downwardly from said top and being dimensioned to receive and contain a said pin when said platter is removed from said top.

12. The structure defined in claim 1 and including in addition a layer of material dimensioned to fit removably on said upper face of said platter, said layer having apertured portions located for registry with said apertured portions of said platter, said platter and layer having means interengageable to position said apertured portions respectively in registry.

13. The structure defined in claim 12 wherein said interengageable means comprises projecting means on one of said platter and layer engaged in recessing in the other thereof.

14. The structure defined in claim 13 wherein said projecting means comprises a plurality of lugs projecting upwardly from said upper face and said recessing comprises a corresponding plurality of recesses in said layer.

15. The structure defined in claim 14 wherein said lugs and recesses are formed respectively adjacent the outer periphery of said platter and said layer.

16. The structure defined in claim 15 wherein said apertured portions comprise aligned holes in said platter and layer disposed on a diameter thereof a right angles to a diameter thereof on which said lugs and recesses are disposed.

* * * * *

UNITED STATES PATENT AND TRADEMARK OFFICE
CERTIFICATE OF CORRECTION

PATENT NO. : 4,227,484

DATED : October 14, 1980

INVENTOR(S) : Humberto Vaca

It is certified that error appears in the above-identified patent and that said Letters Patent are hereby corrected as shown below:

In column 2, line 12, delete "from" and insert -- form --.

Signed and Sealed this

Thirteenth Day of January 1981

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,227,484

DATED : October 14, 1980

INVENTOR(S) : Humberto Vaca

It is certified that error appears in the above-identified patent and that said Letters Patent are hereby corrected as shown below:

In column 6, line 43, after "thereof", delete "a" and insert -- at --.

Signed and Sealed this

Twenty-eighth Day of April 1981

[SEAL]

Attest:

RENE D. TEGTMEYER

Attesting Officer

Acting Commissioner of Patents and Trademarks